United States Patent Office 3,387,195
Patented June 4, 1968

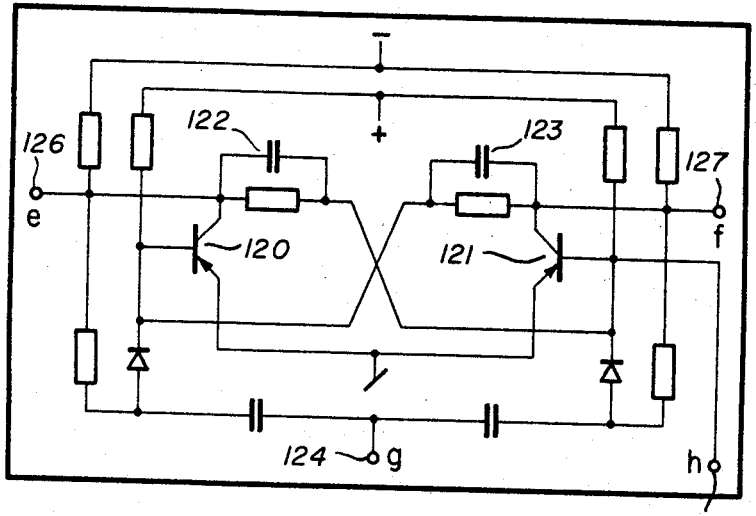
FIG. 6
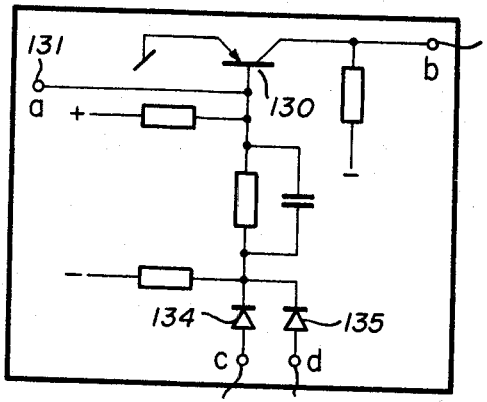
FIG. 7
FIG. 8
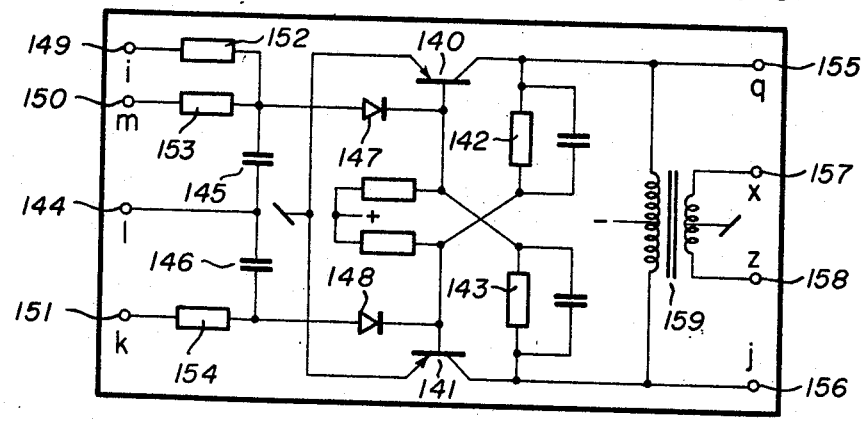

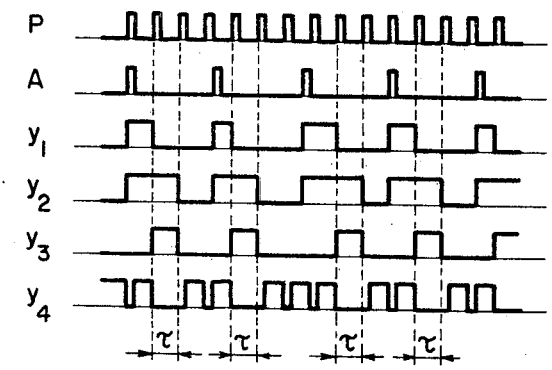
FIG. 9
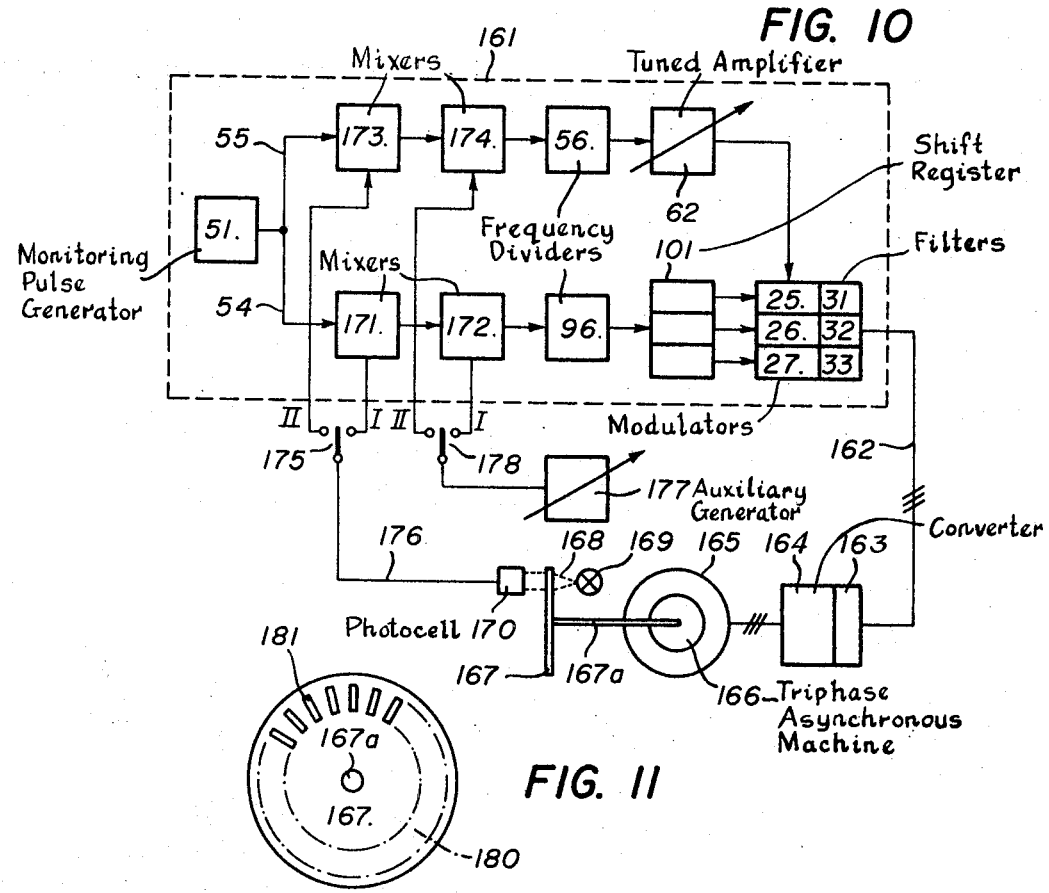
FIG. 10
FIG. 11

3,387,195
METHOD OF AND APPARATUS FOR GENERATING A SINUSOIDAL POLYPHASE CURRENT OF VARIABLE FREQUENCY
Victor Piccand, 13a Chemin des Semailles, Carouge, Geneva, Switzerland, and Jacques Vermot-Gaud, 2 Chemin du Cret de la Neige, Geneva, Switzerland
Filed Sept. 21, 1965, Ser. No. 488,927
Claims priority, application Switzerland, Sept. 22, 1964, 12,329/64
16 Claims. (Cl. 318—227)

ABSTRACT OF THE DISCLOSURE

A method and apparatus for generating a polyphase current, the frequency of which can be varied independently. This is achieved by generating a monophase sinusoidal current and feeding it in parallel to a polychannel path, by generating a rectangular polyphase current, amplitude modulating the monophase current in each channel by the corresponding phase of said polyphase current, filtering said modulated currents to transmit at the outputs of said channels the sole components having a frequency equal to the difference between that of the monophase and that of the polyphase currents, so that said components form the phases of the desired polyphase current, the frequency and, respectively, the amplitude of which may be varied independently by varying the frequency of either said sinusoidal monophase or said rectangular polyphase current, or of both, and the amplitude of said sinusoidal monophase current, respectively. An application of the invention is the control of a static converter supplying an asynchronous machine.

---

This invention relates to a method of and apparatus for generating a sinusoidal polyphase current having $n$ phases and having a frequency and amplitude that can be freely varied independently of one another.

The known methods of generating such a current are either of an electromechanical type or of and an electronic logic type. In the electromechanical method, use is made of a small alternator, driven by a motor rotating at variable speed, which naturally supplies a polyphase wave and this alternator is energized by means of a coil fed through rings, thus importing all of the drawbacks that are inherent in frictional contacts, or by means of a carrier frequency with phase demodulation at the alternator output. This later variant has the advantage over the first of rendering the amplitude completely independent of the desired frequency. However, the speed of the motor must be varied over a range that is as broad as the range of the desired frequencies, which, when the latter range is large, is not easy to achieve. The electromechanical systems moreover suffer from the additional drawback of having little stability, mainly at low speeds.

The method resorting to electronic logic consists in producing a "stepped" wave sufficiently close to a sinusoid. By means of a sequential circuit, a summation network is controlled wherein resistors constituting the relative weights of the summation elements are switched over to a summing resistor either successively or in combination.

This method, which is relatively simple in its principle, always requires for its practice a large number of transistors and diodes particularly if it is desired to vary the amplitude of the output wave and to reverse progressively the direction of rotation of the phases. It has moreover the drawback of only supplying a stepped wave, which can be the cause, at very low speeds, of discontinuities in the motor torque.

The invention eliminates these drawbacks by providing a method of generating a sinusoidal polyphase current having $n$ phases and having a frequency and amplitude that can be freely varied independently of one another, which comprises generating a monophase sinusoidal current of freely-variable amplitude; generating a rectangular $n$-phase current; feeding fractions of said monophase sinusoidal current in parallel to a group of $n$ separate paths; respectively amplitude modulating said current fractitons along said paths by the phases of said rectangular $n$-phase current; filtering the modulated current fractions so as only to pass on the components of said modulated current fractions having a frequency equal to the absolute value of the difference between the frequency of the monophase sinusoidal current and the frequency of the rectangular $n$-phase current, said components together forming said sinusoidal polyphase current having $n$ phases; and varying at will the frequency of said sinusoidal polyphase current by modifying the frequency of at least one of said other currents, and the amplitude of said sinusoidal polyphase current by modifying the amplitude of said monophase sinusoidal current, the order of succession of the phases becoming reversed when the difference between the frequency of the monophase sinusoidal current and that of the rectangular $n$-phase current changes sign.

The invention further provides an apparatus for generating a sinusoidal polyphase current having $n$ phases and having a frequency and amplitude that can be varied at will independently of one another, said apparatus comprising a generator of monophase sinusoidal current of freely variable amplitude and having an output; a generator of rectangular $n$-phase current and having an output for each phase; means associated with at least one of said generators for varying at will the frequency of the current generated thereby; a group of $n$ amplitude modulators each having a first input connected in parallel to the output of said monophase current generator for said modulators each to receive a fraction of said monophase sinusoidal current, a second input connected to one of the outputs of said $n$-phase current generator thereby to modulate the amplitude of each said current fraction by one of the phases of said rectangular $n$-phase current, and an output for discharging the modulated current fraction; a group of $n$ low-pass filters each having an input connected to the output of one of said modulators and an output, and adapted to isolate and to deliver through their outputs the components of said modulated current fractions having a frequency equal to the absolute value of the difference between the frequency of the monophase sinusoidal current and the frequency of the rectangular $n$-phase current, said components issuing from said filter outlets forming together said sinusoidal polyphase current having $n$ phases, the frequency of said sinusoidal polyphase current being variable by actuation of said means and the amplitude of said sinusoidal polyphase current being variable by modifying the amplitude of said monophase sinusoidal current.

An important application of the invention is the control of a static converter which has grid control circuits and which converts direct electric current into alternating electric current, such application being achieved by resorting to the sinusoidal polyphase current of variable frequency and amplitude to monitor the grid control circuits and by varying the frequency of the sinusoidal polyphase current in dependence on the frequency of the alternating current.

This application is of particular interest when the static converter supplies an asynchronous machine. The possibility of varying the frequency of the sinusoidal polyphase current provided by this application enables in particular accurate and stable adjustment of the slip frequency of the machine, i.e. the frequency of its rotor current. In some known regulation systems for controlling an asynchronous machine supplied by a static converter, this adjustment is achieved by means of a tachometric alternator whose rotor is coupled to the rotor of the asynchronous machine through a mechanical differential. The voltage frequency supplied by the alternator differs from that corresponding to the speed of the asynchronous machine by an amount proportional to the speed introduced at the secondary input of the differential. The voltage of the alternator is used to monitor the grid control circuits of the converter and the slip frequency is varied by modifying the speed of the secondary input of the differential.

In other known systems, the mechanical differential is sometimes replaced by an electric differential formed by an auxiliary machine whose rotor is supplied by the tachometric alternator, which is then directly coupled to the rotor of the asynchronous machine, and use is then made of the voltage generated by the stator to monitor the grid control circuits. The slip frequency is varied by modifying the speed of the auxiliary machine rotor.

In either case, the arrangements are electro-mechanical and thus have all of the drawbacks that are inherent thereto, e.g. moving bodies, gear trains, frictional contacts, and wear.

The method according to the invention is thus particularly well suited for such an application, for it enables a purely static construction for the control of the asynchronous machine.

For a better understanding of the invention and to show how it may be carried into effect, the same will now be described by way of example with reference to the accompanying drawings, in which:

FIGS. 6, 7 and 8 are more detailed electrical diagrams relating to elements of FIG. 5;

FIG. 9 is an explanatory diagram for understanding the operation of an element of FIG. 5;

FIG. 10 illustrates the application of the method to the control of a static converter used in a particular manner; and FIG. 11 represents diagrammatically a particular member visible in FIG. 10.

Figure 1:
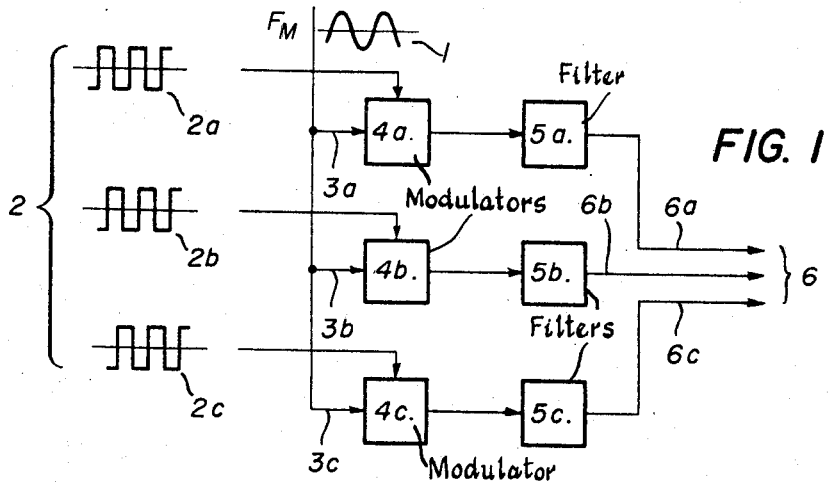
FIG. 1 is a diagram illustrating the principle of the method.

As stated above, the method consists in generating, by any known means, a monophase sinusoidal current, represented in FIG. 1 by curve 1 and by any other known means, a rectangular polyphase current of $n$ phases, for example a triphase current 2 of which the three phases are represented by curves 2a, 2b and 2c. The monophase sinusoidal current 1 is split up into three fractions which are fed in parallel to separate paths 3a, 3b and 3c along which they are modulated by the phases 2a, 2b and 2c respectively, of the rectangular triphase current 2. This modulation is depicted by squares 4a, 4b and 4c. The fractions, once modulated, are then separately filtered along each path, this being represented by squares 5a, 5b and 5c. This filtering is so done as only to retain the component of these fractions having a frequency F equal to the absolute value of the difference between the frequency $F_M$ of the monophase current 1 and the frequency $F_T$ of the triphase carrent 2. These filtered fractions, identified 6a, 6b and 6c, together form a sinusoidal triphase current 6. If it were desired to generate a polyphase current having $n$ phases, it would be necessary to use $n$ paths, like paths 3a, 3b and 3c, and to modulate $n$ fractions of the sinusoidal current 1 by a rectangular polyphase current having $n$ phases.

It is known from Fourier's analysis that a rectangular current consists of a sum of sinusoidal currents whose frequencies are multiples of the fundamental frequency. If then the sinusoidal current 1, of frequency $F_M = \omega_M/2\pi$, represented by the expression $\sin \omega_M t$, is modulated by one of the phases of the rectangular polyphase current whose fundamental component has a frequency $$F_T = \omega_T/2\pi$$

and a phase shift $\varphi$, and which is represented by the expression $\sin(\omega_T t \pm \varphi)$, there is generated a current represented by the product $$\sin \omega_M t \cdot \sin(\omega_T t \pm \varphi)$$
$$= 1/2\{\cos[(\omega_M - \omega_T)t \pm \varphi] - \cos[(\omega_M + \omega_T)t \pm \varphi]\}$$

The harmonics of the rectangular current give rise to analogous components and the effect of the filtering serves to retain only the component of frequency $$F = (\omega_M - \omega_T)/2\pi = F_M - F_T$$

and to eliminate all components of higher frequencies. The same applies to the modulations carried out by the other phases of the rectangular polyphase current. By varying one of the frequencies $F_M$ and $F_T$, or both at the same time, the frequency F is caused to vary but the phase shift $\varphi$ is retained. Thus the currents appearing after filtering together form a sinusoidal polyphase current whose phases are equal in number to that of the modulating rectangular polyphase current and are shifted to the same extent as the phases of this latter current. There is nothing to exclude that $F_M = F_T$, or even that $F_M < T_T$, so that the frequency F can become nil or even negative, this latter case corresponding in fact to a reversal of the order of succession of the phases of the sinusoidal polyphase current. That is why the filtering must only retain those components having a frequency equal to the absolute value of the difference between the frequencies $F_M$ and $F_T$. As for the amplitude of the sinusoidal polyphase current, it varies with the amplitude of the monophase current and its variation is absolutely independent of that of the frequency.

Figure 2:
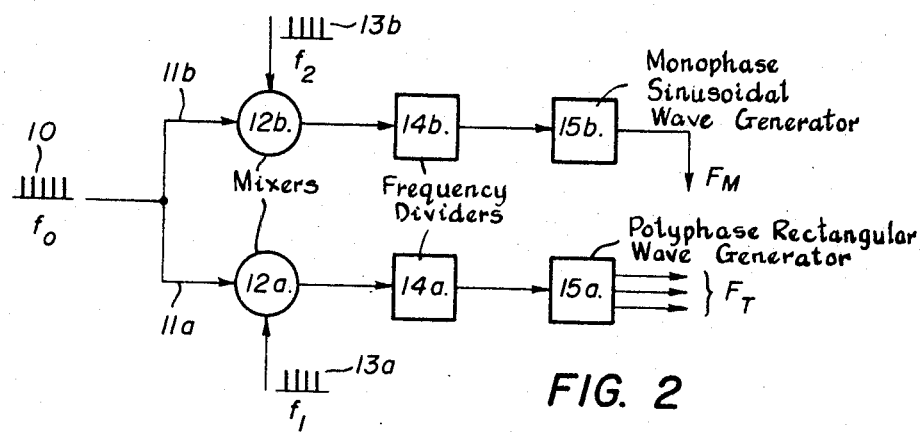
FIGS. 2 and 3 represent two ways of generating two electric currents used by the method.

To generate the monophase sinusoidal current and the rectangular triphase current, it is advantageous to start off with a succession of periodic impulses having a high frequency $f_0$. This is what is illustrated in FIG. 2. The succession of high frequency monitoring impulses, represented by curve 10, is fed in parallel to two paths, 11a and 11b respectively, along which these impulses from successions of periodic, termed primary, signals. At least one of these primary successions is disturbed by mixing therewith an auxiliary succession of periodic signals. Thus the primary succession travelling along path 11a is mixed at 12a with a succession of auxiliary periodic signals having a frequency $f_1$ and which are represented by curve 13a. This produces a succession of pseudo-periodic signals whose pseudo-frequency is equal to $f_0 + f_1$, if the mix is additive, and to $f_0 - f_1$, if the mix is subtractive. This pseudo-periodic succession is subjected at 14a to a frequency division and becomes a succession of rectangular signals having a mean frequency. These rectangular signals are substantially periodic, the frequency division having the effect of smoothing the deviation in relation to a periodic succession, caused by the mix carried out at 12a. By any suitable means and from these rectangular signals, there is generated at 15a a triphase rectangular current having a frequency $F_T$ and which is none other than the rectangular triphase current 2 of FIG. 1. As for the succession of primary signals travelling along path 11b, it can be subjected without prior modification to a frequency division, carried out at 14b, to transform it into a succession of periodic rectangular signals of mean frequency. From this succession, there is generated at 15b, by any suitable means, a monophase sinusoidal current of mean frequency, having a value $F_M$. This current is none other than the monophase sinusoidal current 1 of FIG. 1. It may however be advantageous, before subjecting this succession to the frequency division at 14b, to disturb it by mixing, either additive or subtractive, with an auxiliary succession of periodic signals having a frequency $f_2$ and which are represented by curve 13b so as to obtain a succession of pseudo-periodic signals having a pseudo-frequency of $f_0 \pm f_2$, and to subject this pseudo-periodic succession to the frequency division carried out at 14b. To modify the frequency of the sinusoidal polyphase current, it suffices to act on either of frequencies $f_1$ and $f_2$ or on both of them together. Any instability affecting the frequency $f_0$ is thus eliminated since the frequency F of the sinusoidal polyphase current has a value $$F = F_M - F_T = (f_0 \pm f_1) - (f_0 \pm f_2) = \pm f_1 \mp f_2$$

and is independent of the frequency $f_0$ of the monitoring succession.

Figure 3:
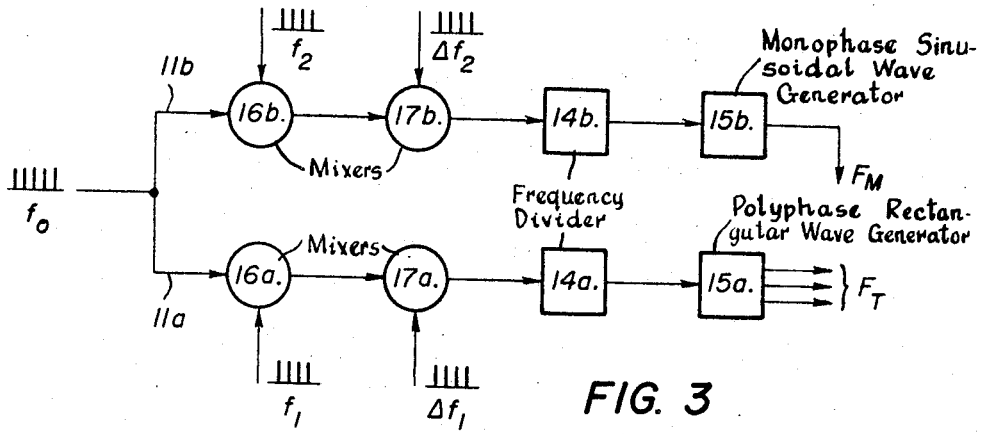

Instead of mixing the succession of primary signals with the succession of auxiliary signals in one operation, it may be advantageous to carry out two successive mixes. This is what is shown in FIG. 3 wherein the succession of primary signals travelling along path 11a is shown to be disturbed a first time at 16a by mixing with a first succession of auxiliary signals of frequency $f_1$, and then a second time at 17a by mixing with a second succession of auxiliary signals of a frequency $\Delta f_1$, before having its frequency divided at 14a. As shown by FIG. 3, this two-step disturbance can also be applied to the succession of primary signals travelling along path 11b, by mixing therewith, at 16b, a first succession of auxiliary signals of frequency $f_2$, and then, at 17b, a second succession of auxiliary signals of frequency $\Delta f_2$. The thus disturbed succession is then subjected to frequency division at 14b. There are thus four ways available for varying the frequency of the polyphase sinusoidal current: by simultaneously or separately acting on the frequencies $f_1$, $\Delta f_1$, $f_2$, $\Delta f_2$ of the four successions of auxiliary signals. This renders frequency regulation highly flexible.

Figure 4:
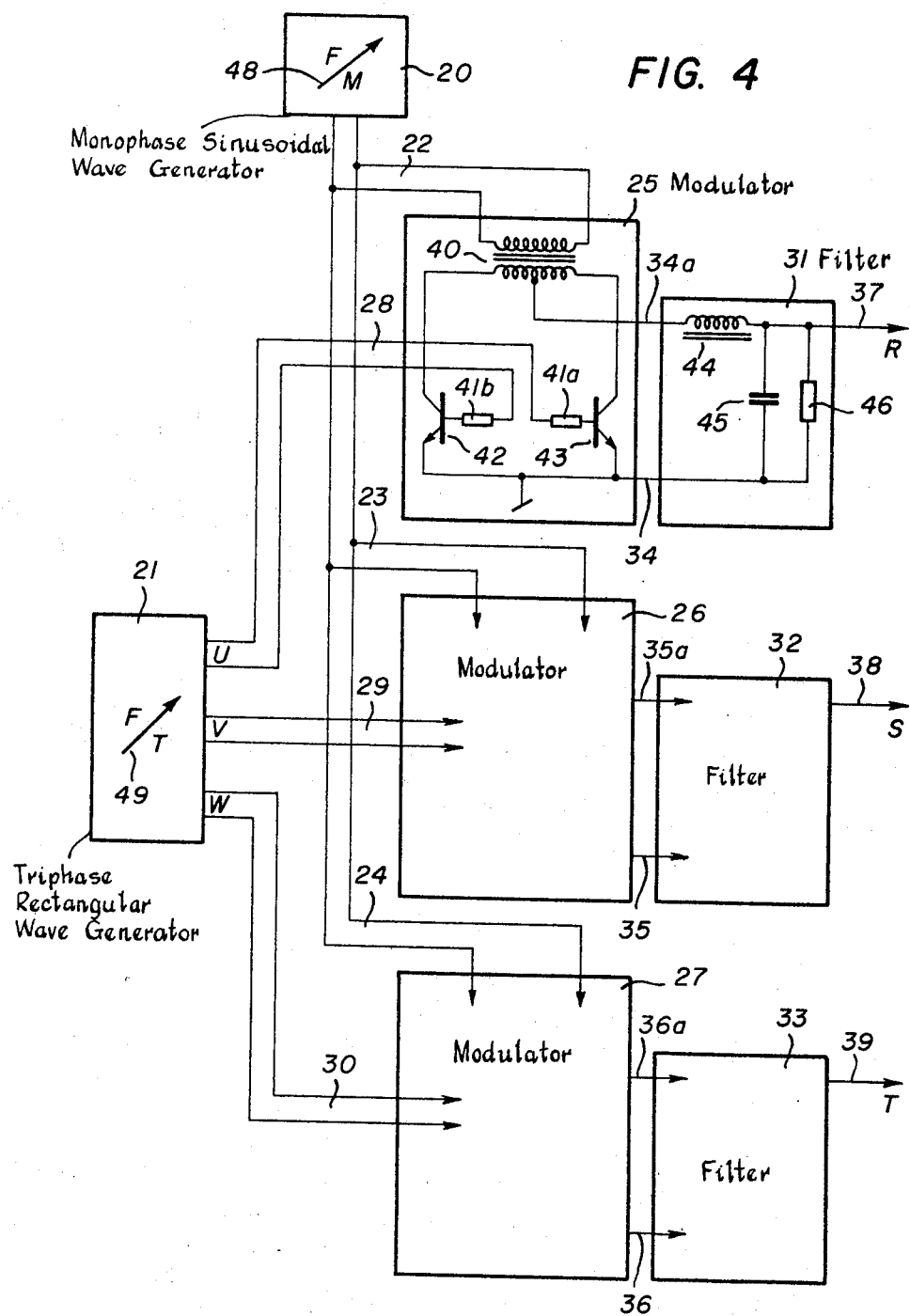
FIG. 4 is an electrical diagram of an apparatus for carrying out the method illustrated by FIG. 1.

The apparatus for carrying out the described method is diagrammatically represented in FIG. 4, for the special case where the generated sinusoidal polyphase current is triphase. It comprises a generator 20 of monophase sinusoidal current of frequency $F_M$, and a generator 21 of rectangular triphase current of frequency $F_T$ and whose three phases succeed one another in the order U, V, W. These generators are of any type; details thereof need not be given for the time being but a possible constructional form will be described later. The monophase sinusoidal current is conveyed in parallel, via pairs of lines 22, 23 and 24, to three identical modulators 25, 26 and 27, of which only modulator 25 is drawn in detail. These modulators are moreover separately connected, via pairs of lines 28, 29 and 30 respectively, to the phases of the rectangular triphase current generator 21: lines 28 transmit phase U to modulator 25, lines 29 transmit phase V to modulator 26 and lines 30 transmit phase W to modulator 27. The modulators are followed by filters 31, 32 and 33 respectively, which are connected thereto by pairs of lines 34 and 34a, 35 and 35a, and 36 and 36a respectively, and these filters are provided with output lines 37, 38 and 39 respectively. The type of modulator is arbitrary but in the present instance, the modulators are transistorized. They are identical to modulator 25 which has an input transformer 40, with its primary connected to lines 22 carrying the monophase sinusoidal current, and two transistors 42 and 43 of the n-p-n type, having their bases separately connected, via resistors 41a and 41b, to the pair of lines 28 carrying phase U, their emitters being connected to one another and their collectors being connected to opposite ends of the secondary of the input transformer 40. The filters are all identical to filter 31 which has an inductance coil 44 whose input is connected, via line 34a, to the mid-point of the secondary of the input transformer 40 and whose output is connected to an output line 37 and to a capacitor 45 which is connected, via line 34, to the emitters of transistors 42 and 43 and which is shunted by a resistor 46.

The output lines 37, 38 and 39 thus carry a current resulting from the filtering, through filters 31, 32 and 33, of the monophase sinusoidal current of frequency $F_M$ which was modulated, through modulators 25, 26 and 27, by phases U, V and W, respectively, of the rectangular triphase current of frequency $F_T$. These output lines thus each carry one of the phases R, S and T, respectively, of a sinusoidal triphase current having a frequency $F = F_M - F_T$. If frequency $F_M$ is greater than $F_T$, the order of succession of phases R, S, T is identical to that of phases U, V, W; if frequency $F_M$ is less than $F_T$, this order is the reverse of that of phases U, V, W. By varying frequency $F_T$, or frequency $F_M$, or both at the same time, which is what is shown by arrows 48 and 49, the frequency F of the sinusoidal triphase current can thus be freely varied, even to the extent of reversing the order of succession of its phases, and by varying the amplitude of the sinusoidal monophase current of frequency $F_M$, the amplitude of the sinusoidal triphase current of frequency F can freely be varied. These two variations are absolutely independent of one another.

Figure 5:
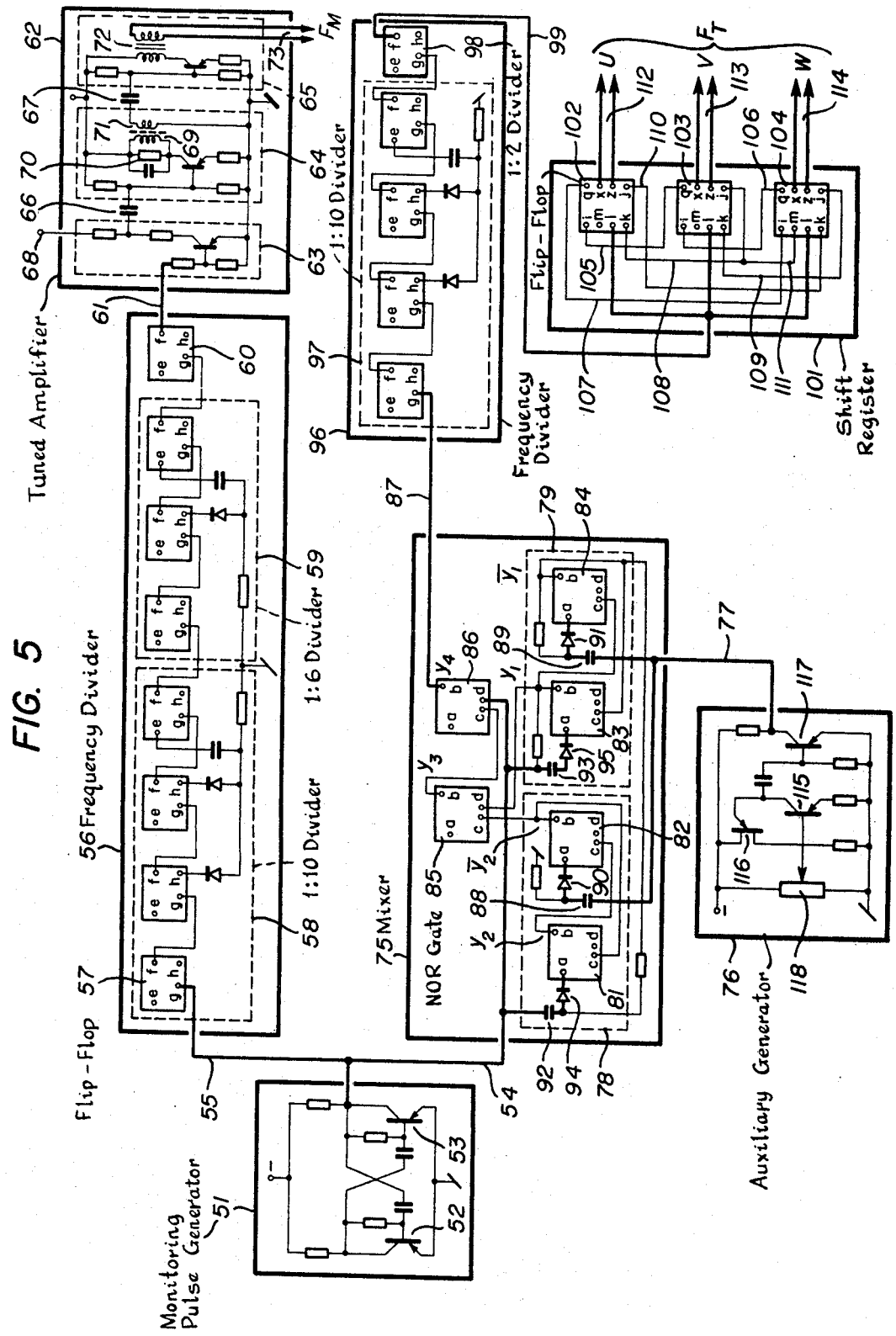
FIG. 5 shows one constructional form of part of the FIG. 4 circuits.

It may be advantageous to generate both the rectangular triphase of frequency $F_T$ and the monophase sinusoidal current of frequency $F_M$ from a common succession of monitoring impulses. This is what is shown in FIG. 5. A monitoring generator 51, consisting of a conventional multivibrator having two transistors 52 and 53, generates a succession of periodic, termed primary, impulses of high frequency, $f_0$, which are fed to two paths 54 and 55 respectively. In path 55 is inserted a frequency divider 56 formed by a plurality of identical flip-flop circuits 57.

These flip-flop circuits 57 are quite conventional, as shown by their diagram represented in FIG. 6. They each include two p-n-p type transistors 120 and 121 having common emitters and push-pull coupled through RC network 122 and 123. They are each provided with a main input 124, designated g, with an auxiliary input 125, designated h, and with two outputs 126 and 127, designated e and f.

In the described example, the divider 56 (FIG. 5) is adapted to divide by one hundred and twenty and the flip-flop circuits are arranged to form a sub-group 58, which divides by ten, a second sub-group 59, which divides by six, and a final sub-group 60 which has only a single flip-flop circuit and which divides by two. The output 61 of divider 56 thus carries a succession of rectangular signals having a mean frequency, this frequency being equal to $f_0/120$, and conveys them to a tuned amplifier 62. The latter includes a pre-amplifying stage 63, a tuned stage 64 and a final stage 65, which stages are coupled to one another through capacitors 66 and 67 respectively. The pre-amplifying stage 63 is of the ON-OFF type, and the amplitude of the signal it delivers may be regulated by varying the negative voltage applied to terminal 68. This rectangular signal is transmitted via capacitor 66 to the tuned stage 64 wherein an anti-resonant circuit 69 transforms it into a sinusoidal signal. A damping resistor 70 serves to attenuate greatly the overvoltage of the anti-resonant circuit 69 so as to broaden the transmission band of the latter without however substantially attenuating its filtering power with respect to the lowest order harmonic of the rectangular signal, which harmonic is that of the order three. The sinusoidal signal thus elaborated is inductively picked up by a winding 71 and transmitted to the final stage by the capacitor 57. An output transformer 72 picks up the amplified signal and feeds it to a pair of lines 73. The tuned amplifier 62 is thus adapted to supply a sinusoidal current having a frequency $F_M = f_0/120$ which corresponds in fact to the monophase current mentioned earlier, so that the tuned amplifier 62 and the divider 56 constitute together with the monitoring generator 51, a generator of monophase sinusoidal current.

In path 54 is inserted a mixing stage 75 formed by a plurality of NOR type logic circuits.

These NOR circuits are also quite conventional and their diagram is reproduced in FIG. 7. They include a p-n-p type transistor 130 having a grounded emitter, a main input 131 connected to the base and designated $a$, two auxiliary inputs 132 and 133 provided with diodes 134 and 135 and designated $c$ and $d$, and an output 136 connected to the collector and designated $b$.

In the described example, the mixing stage 75 (FIG. 5) is intended to carry out a substractive mix of the impulses carried by path 54 and of the impulses, termed auxiliary, conveyed from an auxiliary generator 76 by a line 77. That is why the NOR circuits are arranged in two sub-groups 78 and 79 which each include two flip-flop connected NOR circuits. Thus, sub-group 78 includes circuits 81 and 82, and the input $c$ of circuit 81 is connected to the input $b$ of circuit 82 while the input $c$ of circuit 82 is connected to the output $b$ of circuit 81. Sub-group 79 is similarly formed by means of circuits 83 and 84. A fourth NOR circuit, circuit 85, is connected by its first input $c$ to the output $b$ of circuit 82 of sub-group 78 and by its other input $d$ to the output $b$ of circuit 83 of sub-group 79. This circuit thus generates at its output $b$ a logic signal whose value is determined by the combination of the logic signals appearing at its inputs $c$ and $d$, i.e. by the change-over state of sub-groups 78 and 79. It thus serves as a circuit for detecting the change-over state of these sub-groups. Its output $b$ is connected to the first input $c$ of a fifth NOR circuit 86 whose second input $d$ is connected to path 54. This circuit 86 generates at its output $b$ a signal which depends on the combination of logic signals fed to its inputs, the signal fed to input $c$ being the signal generated by the detection circuit 85 and the signal fed to input $d$ being any one of the primary impulses. The circuit 86 thus acts as a gate, allowing or preventing the passage of this primary impulse to the output line 87 of the mixing stage 75, depending on the change-over state of sub-groups 78 and 79. Line 77 links the output of the auxiliary generator 76 to the control inputs $a$ of the second NOR circuits of sub-groups 78 and 79, i.e. of circuit 82 in sub-group 78 and of circuit 84 in sub-group 79, through capacitors 88 and 89 followed by diodes 90 and 91 respectively. As for the first circuits 81 and 83 of these sub-groups, they have their control inputs $a$ linked, via capacitors 92 and 93 followed by diodes 94 and 95, respectively, to the path 54 carrying the primary impulses. This mixing stage 75 thus serves to ensure the mixing of the primary impulses with the secondary impulses and this mix, which will later be seen to assume the form of a succession of pseudo-periodic impulses, appears on output line 87.

This line 87 connects the output of the mixing stage 75 to the input of a second frequency divider 96 which is adapted to divide by twenty. Divider 96 consists of a group of flip-flop circuits identical to the flip-flop circuits 57 of the first frequency divider 56; these flip-flop circuits are arranged to form a first sub-group 97, which divides by ten and which is identical to sub-group 58, and by a second sub-group 98 which has only a single flip-flop circuit and which divides by two. The pseudo-frequency of the succession of pseudo-periodic impulses carried by line 87 is thus divided by twenty and the output line 99 of divider 96 carries impulses having a frequency of $f_0/20$.

This line 99 connects the output of divider 96 to the input of a shift register 101 comprising three flip-flop stages 102, 103 and 104. These stages are identical to one another and are formed in known manner, according to the diagram shown in FIG. 8. They include two p-n-p type transistors 140 and 141, with common emitters, which are push-pull coupled by RC networks 142 and 143. They are provided with a main input 144, designated $l$, which supplies the two transistors through capacitors 145, 146 and diodes 147, 148, and with three auxiliary inputs 149, 150 and 151. Of the latter, the auxiliary inputs 149 and 150, designated $i$ and $m$ respectively, supply one of the transistors, here transistor 140, through resistors 152 and 153 respectively, and the diode 147. The third auxiliary input 151, designated $k$, supplies the other transistor, here transistor 141, through a resistor 154 and the diode 148. Two outputs, 155 and 156, designated $q$ and $j$ respectively, are connected to the collectors of transistors 140 and 141 whereas the signal is tapped at terminals 157 and 158, designated $x$ and $z$, of the secondary of a transformer 159 whose primary is connected across these collectors.

The stages 102, 103 and 104 (FIG. 5) are connected to one another in the manner indicated: the auxiliary input $i$ of stage 102 is linked by a line 105 to the output $q$ of the homologous transistor of the consecutive stage 103, the auxiliary input $i$, which is connected to the same transistor of stage 103, is linked by a line 106 to the output $q$ of the homologous transistor of the consecutive stage 104, and the auxiliary input $i$, which is connected to the same transistor of stage 104, is linked by a line 107 to the output $q$ of the homologous transistor of the consecutive stage 102. The auxiliary inputs $k$ are similarly linked to the outputs $j$ of the homologous transistors of the consecutive stages by lines 108, 109 and 110 respectively. The shift register 101 thus forms a closed loop arrangement and the interconnections between all the stages are perfectly symmetrical, with the exception that stage 104 has its second auxiliary input $m$ linked by a line 111 to the output $j$ of stage 103. The inputs $l$ of the three stages 102, 103 and 104 are connected to the line 99. Pairs of lines 112, 113 and 114 are connected to the terminals $x$ and $z$ of stages 102, 103 and 104 respectively, and it will be seen later that these three pairs of lines each carry one of the phases U, V, W of the rectangular polyphase current of frequency $F_T$.

As for the auxiliary generator 76, this is a conventional generator which includes a current source mounted, p-n-p type, transistor 115 and a unijunction transistor 116, which are interconnected to form relaxation oscillator, and a p-n-p type transistor 117 forming the final stage for shaping the oscillations. The latter appear on the output line 77 and form the succession of auxiliary impulses, the frequency $f_1$ of the latter being modifiable by changing the position of the slide of a potentiometer 118 which adjusts the voltage applied to the base of transistor 115.

The apparatus represented in FIG. 5 operates as follows.

Those primary impulses of frequency $f_0$ issuing from the monitoring generator 51 and travelling along path 55 undergo in divider 56 a frequency division of one hundred and twenty, and come out on line 61 in the form of rectangular signals. The latter are transformed by the tuned amplifier 62 into a monophase sinusoidal current of frequency $F_M = f_0/120$. The tuned amplifier 62 and the frequency divider 56 thus form, together with the monitoring generator 51, a generator of monophase sinusoidal current, which plays the part attributed to the generator 20 of FIG. 4: it suffices to connect the pairs of lines 22, 23, 24 to the pair 73 in FIG. 5.

Those primary impulses of frequency $f_0$ issuing from the monitoring generator 51 and travelling along path 54 are transmitted to the mixing stage 75. Clearly, in the latter, the two outputs $b$ of each of the two sub-groups 78 and 79 comprised thereby are complementary to one another from the logic point of view. If, in sub-group 79, the logic signal at the output $b$ of NOR circuit 83, whose input $a$ is connected to the primary impulse transmitting line 54, were designated $y_1$, the logic signal appearing at the output $b$ of NOR circuit 84, whose input $a$ is connected to the auxiliary impulse transmitting line 77, would be $\bar{y}_1$, the complement of $y_1$. Similarly, in sub-group 78, if the logic signal appearing at the output $b$ of NOR circuit 81, receiving the primary impulses, were represented by $y_2$, the signal appearing at the output $b$ of NOR circuit 82, receiving the auxiliary impulses, would be $\bar{y}_2$. Now $y_1$ and $y_2$ simultaneously assume the value "one" when an auxiliary impulse appears on line 77, whereas $y_1$ returns to "zero" when the next primary impulse appears. As for $y_2$, it returns to "zero" when a primary impulse appears, provided $y_1$ has previously returned to "zero." This is what has been shown in FIG. 9 wherein P is the succession of primary impulses and A is the succession auxiliary impulses. Consequently, $y_2$ can only return to zero with a time lag, in relation to $y_1$, equal to one period $\tau$ of the primary impulses. Thus during one full period of the primary impulses, $y_1=0$ and $y_2=1$ simultaneously. During this period, the output of NOR circuit 85, charged with detecting the change-over state, delivers as signal $$y_3 = \overline{y_1 + \overline{y_2}} = \overline{y_1} \cdot y_2$$

having a value of "one" during this period and a value of "zero" during the remaining time. The output of gate 86 delivers a signal $y_4 = \overline{P + \overline{y_3}} = \overline{P} \cdot y_3$, having a value of "zero" at least over the entire period $\tau$ during which $y_3$ has a value of "one." As a result, a primary impulse is cut out each time there appears an auxiliary impulse. The signal $y_4$ appearing on line 87 (FIG. 5) is thus a succession of pseudo-periodic impulses obtained by subtractive mixing of the primary succession with the auxiliary succession.

This pseudo-periodic succession is then fed to the divider 96 wherein its pseudo-frequency is divided by twenty and out of the divider issues a succession of rectangular substantially periodic signals of mean frequency, the division by twenty having smoothed the deviation of the pseudo-periodic succession from a periodic succession.

These mean frequency rectangular signals are transmitted to the shift register 101. In view of the interconnections of the latter's three stages, the successive impulses forming these rectangular signals cause these stages to change-over cyclically and it is only after three impulses that a given stage changes over in the reverse direction. The time separating two change-overs in opposite directions is thus equal, for a given stage, to three periods of the rectangular signals, and the rocking of one stage is delayed in relation to the change-over of an adjacent stage by a duration equal to two periods. Consequently, each of the pairs of lines 112, 113 and 114 carries a rectangular wave whose frequency is six times less than the frequency of the mean frequency signals, the waves of one line being delayed by one third of their period in relation to those of adjacent lines. These waves thus together form a rectangular triphase current having a frequency of $(f_0-f_1)/120$, each of the phases U, V, W of this current being carried by one of the pairs of lines 112, 113 and 114.

The shift register 101, the frequency divider 96 and the mixing stage 75 form, together with the monitoring generator 51, a generator of rectangular polyphase current capable of performing the part attributed to generator 21 in FIG. 4: it suffices to connect the pairs of lines 28, 29 and 30 to the pairs 112, 113 and 114 of FIG. 5, the variation of frequency $F_T$ of the rectangular polyphase current being achieved by modifying the frequency $f_1$ of the auxiliary generator 76.

The apparatus thus generates a sinusoial triphase current having a frequency $$F = F_M - F_T = [f_0 - (f_0 - f_1)]/120 = f_1/120$$

In the above example, the generation of monophase sinusoidal current and of rectangular triphase current is initiated by a monitoring generator operating at $f_0 = 240$ kc./s. Consequently, the frequency of the monophase sinusoidal current is $f_0/120 = 2$ kc./s. and that of the rectangular triphase current is $(240-f_1)/120$. By selecting for $f_1$ a frequency that can vary between 0 and 18 kc./s., it will be appreciated that the apparatus will be able to generate a highly stable triphase current having a frequency F that can be freely varied between $$F = 2 - [2-0] = 0 \text{ c./s. and}$$

$$F = 2 - [2-18/120] = 0.15 = 150 \text{ c./s.}$$

Obviously, the mixing operation giving rise to the pseudo-periodic succession can be split up into two stages by resorting to two consecutive mixing stages, similar to stage 75 (FIG. 5) and tandem connected one behind the other. Moreover, there is nothing to prevent the insertion in path 55 of one or even two mixing stages so as also to be able freely to vary the frequency of the monophase sinusoidal current. In such a case, the value of frequency F is $$F = [(f_0 - f_2) - (f_1 - f_1)]/120 = [f_1 - f_2]/120$$

If $f_1 - f_2$ is positive, the phases succeed one another in a particular order and if $f_1 - f_2$ is negative, this order is reversed.

Finally, if it is desired to generate a polyphase current having $n$ phases, instead of three, it suffices to provide a generator 21 (FIG. 4) for generating a rectangular polyphase current having $n$ phases instead of three. This amounts to providing the shift register 101, if it is desired to generate this rectangular polyphase current from a monitoring generator 51 (FIG. 5), with a number of stages equal to that of the phases.

The mixing stage 75 referred to earlier carries out a substractive mix of the primary impulse succession with the auxiliary impulse succession. But a mixing stage for carrying out an additive mix of these successions can be provided instead.

It will be observed that the production of the two currents, the monophase sinusoidal current and the rectangular triphase current, from a common monitoring generator provides the apparatus with considerable operational flexibility, and at frequency F with great stability, equal to that of the auxiliary generator 76.

An important application of the above-described method is for the control of a static converter which is provided with grid control circuits and which converts direct electric current into alternating electric current. In this application, the sinusoidal polyphase current is used to monitor these grid control circuits and the frequency of the sinusoidal polyphase current is made to vary in dependence on this alternating current. This application is of particular interest when the static converter supplies an asynchronous electric machine having a speed of rotation depending on the frequency of the alternating current supplied thereto. By providing this machine with a pick-off capable of delivering tachometric signals representing the speed of its rotor, these signals can be used to modify, in dependence on this speed, the frequency of the rectangular triphase current generator or of the monophase sinusoidal current generator. The frequency of the sinusoidal triphase current monitoring the grid control circuits of the converter, and hence the frequency of the alternating current supplied to the asynchronous machine, is thus servo-controlled by the true speed of its rotor. The frequency of the asynchronous machine supply current can thus be rendered strictly equal to that ensuring a slip frequency of zero, while taking into account the number of pairs of poles. To achieve the necessary slip frequency for the machine to deliver torque, it thus suffices to increase the supply current frequency by an amount equal to the required slip frequency, when the asynchronous machine is to operate as a motor, or to decrease this frequency by the same amount when the asynchronous is required to operate as a brake.

If the monophase sinusoidal current and the rectangular triphase current are generated from a monitoring generator, in accordance with the diagram of FIG. 5, it is impossible to use the speed pick-off as an auxiliary generator supplying the mixing stage. This application is shown in diagram form in FIG. 10 wherein the sinusoidal triphase current generator 161 is seen to energize, via a line 162, the grid control circuits 163 of a static converter 164 supplying a triphase asynchronous machine 165. The rotor 166 of the latter is provided with a disc 167 which is coupled thereto by a shaft 167a and which is formed at its periphery 180 (FIG. 11) with regularly spaced slots 181 for modulating a light beam 168 (FIG. 10) issuing from a light source 169. This beam 168 impinges on a photo-electric receiver 170 which generates tachometric signals consisting of a succession of electric impulses, each impulse corresponding to the passage of a slot of disc 167 before source 169. The sinusoidal polyphase current generator 161 is formed by a plurality of modulators 25, 26 and 27, and of filters 31, 32 and 33, these components being identical to those described in relation to FIG. 4, and by a circuit similar to that of FIG. 5 as regards the generator of monophase sinusoidal current and the generator of rectangular polyphase current. This circuit consists of a monitoring generator 51 supplying in parallel path 54, terminating at the frequency divider 96 and at the shift register 101, and path 55 terminating at the frequency divider 56 and at the variable gain tuned amplifier 62. The only difference lies in the fact that path 54 includes two mixing stages 171 and 172, and that path 55 also includes two mixing stages 173 and 174. These mixing stages are identical to stage 75 of FIG. 5 and carry out substractive mixing. A switch 175 enables the tachometric signals, carried by a line 176 from receiver 170, to be selectively conveyed to the first mixing stage 171 of path 54 or to the first mixing stage of path 55. The receiver 170 thus acts as the auxiliary generator 76 in FIG. 5, but it can selectively be connected to the first mixing stage that is inserted in either of paths 54 and 55. An auxiliary generator 177, of variable frequency, is connected to a switch 178 which enables it to be selectively connected to either of the second mixing stages 172 and 174 inserted in paths 54 and 55.

In this application, use is thus made of the tachometric signals formed by the impulses generated by the receiver 170 to disturb, by subtractive mixing in the mixing stages 171 and 173, the primary impulses generated by the monitoring generator 51. Since the tachometric signals have a frequency $f_m$ depending on the speed of the rotor 166 of the asynchronous machine 165, the frequency of the supply current produced by the static converter 164 is thus servo-controlled by the speed of the machine. By again disturbing the succession of impulses resulting from thus first mixing operation by subjecting it in the mixing stage 172 or 174 to a fresh mixing operation with the impulses generated by the auxiliary generator 177, the frequency of the supply current is again modified and to an extent which depends on the frequency $\Delta f$ of the auxiliary generator 177. The divider 56 being adapted to divide by a factor $2Kn$ and the divider 96 being adapted to divide by a factor K, it will be observed that the frequency $F = F_M - F_T$ will have, depending on the positions of switches 175 and 178, the following values:

(a) With switches 175 in position I and 178 in position I:

$$F = [f_0 - (f_0 - f_m - \Delta f)]/2Kn = [f_m + \Delta f]/2Kn$$

The asynchronous machine then rotates in a first direction and operates as a motor.

(b) With switches 175 in position I and 178 in position II:

$$F = [(f_0 - \Delta f) - (f_0 - f_m)]/2Kn = [f_m - \Delta f]/2Kn$$

The asynchronous machine again rotates in this first direction but operates as a brake.

(c) With switches 175 in position II and 178 in position II:

$$F = [(f_0 - f_m - \Delta f) - f_0]/2Kn = [-f_m - \Delta f]/2Kn$$

The asynchronous machine then rotates in the opposite direction and operates as a motor.

(d) With switches 175 in position II and 178 in position I:

$$F = [(f_0 - f_m) - (f_0 - \Delta f)]/2Kn = [-f_m + \Delta f]/2Kn$$

The asynchronous machine again rotates in the opposite direction but operates as a brake.

In general, the frequency has a value $$F = [\pm f_m \pm \Delta f]/2Kn$$

which expression covers all possible cases.

As regards the variation of frequency $\Delta f$, this makes it possible to regulate the frequency of the rotor current and hence to regulate the value of the torque exerted by the rotor of the asynchronous machine, such regulation being independent of the value of the supply current amplitude, which amplitude can be separately varied by modifying the gain of the tuned amplifier 62.

This application of the method of generating a sinusoidal polyphase current of variable frequency to supply the grid control circuits of a static converter which in turn supplies an asynchronous machine makes it possible simultaneously to achieve wholly static and very flexible regulation of the machine.

What is claimed is:
1. A method of generating a sinusoidal polyphase current having $n$ phases and having a frequency and amplitude that can be freely varied independently of one another, which comprises generating a monophase sinusoidal current of freely variable amplitude; generating a rectangular $n$-phase current; feeding fractions of said monophase sinusoidal current in parallel to a group of $n$ separate paths; respectively amplitude modulating said current fractions along said paths by the phases of said rectangular $n$-phase current; filtering the modulated current fractions so as only to pass on the components of said modulated current fractions having a frequency equal to the absolute value of the difference between the frequency of the monophase sinusoidal current and the frequency of the rectangular $n$-phase current, said components together forming said sinusoidal polyphase current having $n$ phases; and varying at will the frequency of said sinusoidal polyphase current by modifying the frequency of at least one of said other currents, and the amplitude of said sinusoidal polyphase current by modifying the amplitude of said monophase sinusoidal current, the order of succession of the phases becoming reversed when the difference between the frequency of the monophase sinusoidal current and that of the rectangular $n$-phase current changes sign.

2. A method according to claim 1, which comprises generating, from a monitoring succession, two identical successions of primary periodic signals of high frequency; disturbing at least one of said two successions of primary signals by adjoining thereto, through either additive or subtractive mixing, at least one succession of auxiliary periodic signals having a frequency less than that of said primary signals, said mixing yielding a succession of pseudo-periodic signals; dividing the frequency of each of said successions of signals, periodic and pseudo-periodic, to obtain two successions of rectangular signals of mean frequencies; transforming one of said mean frequency successions into a sinusoidal signal, to obtain said monophase sinusoidal current; and transforming the other of said mean frequency signals into said rectangular polyphase current, thereby generating from said monitoring succession said monophase sinusoidal current and said rectangular polyphase current.

3. A method according to claim 2, comprising disturbing one of said successions of primary signals by adjoining thereto, through additive or subtractive mixing, a succession of auxiliary signals of variable frequency, the frequency of said sinusoidal polyphase current being variable by modification of the frequency of said succession of auxiliary signals.

4. A method according to claim 2, comprising disturbing one of said successions of primary signals by adjoining thereto, through additive or subtractive mixing, a first succession of auxiliary signals of variable frequency, further disturbing the succession of signals issuing from such mixing by adjoining thereto, through additive or subtractive mixing, a second succession of auxiliary signals of variable frequency, whereby these two successive mixing operations give rise to said succession of pseudo-periodic signals, the frequency of said sinusoidal polyphase current being variable by modifying that of the first and/or second of the two successions of auxiliary signals.

5. A method according to claim 2, comprising disturbing by means of at least one of said successions of auxiliary signals the second of said successions of primary signals to the exclusion of the first, the frequency of said sinusoidal polyphase current being variable by modifying the frequency of the first and/or second successions of auxiliary signals, whereby the frequency of said sinusoidal polyphase current may be varied by modifying the frequency of said rectangular polyphase current, the frequency of said monophase sinusoidal current being variable.

6. A method according to claim 1 for controlling a static converter having grid control circuits and adapted to convert a direct electric current into an alternating electric current, comprising using said sinusoidal polyphase current of variable frequency and amplitude to monitor said grid control circuits and varying frequency of the sinusoidal polyphase current in dependence on the frequency of the alternating current.

7. A method according to claim 1, for controlling a static converter supplying an asynchronous electric machine having a speed of rotation depending on the frequency of the alternating current supplied thereto and having a pick-off for delivering tachometric signals representing said speed of rotation, comprising servo-controlling the frequency of said sinusoidal polyphase current by the speed of rotation of said asynchronous machine through said tachometric signals by using said tachometric signals to modify, in dependence on said speed of rotation, the frequency of at least said rectangular $n$-phase current whereby the frequency of said sinusoidal polyphase current is regulated in dependence on that of the alternating current.

8. A method according to claim 7, which comprises generating from a monitoring succession two identical successions of primary periodic signals of high frequency, disturbing at least one of said two successions of primary signals by adjoining thereto, through additive or subtractive mixing, at least one succession of auxiliary periodic signals having a frequency less than the frequency of said primary signals, dividing the frequency of each of said successions of signals, periodic and pseudo-periodic to obtain two successions of rectangular signals having mean frequencies, transforming one of said mean frequency successions into a sinusoidal signal to obtain said monophase sinusoidal current, transforming the second of said mean frequency successions into said rectangular $n$-phase current, so that said monophase sinusoidal current and said rectangular $n$-phase current are generated from said monitoring succession, and modifying in dependence on the speed of rotation of said asynchronous machine the frequency of at least said rectangular $n$-phase current by taking said tachometric signals to form that one of said successions of auxiliary periodic signals which is intended to disturb at least said second succession of primary signals.

9. A method according to claim 8, which comprises acting at least on said second succession of primary signals by adjoining thereto, during a first mixing operation, a first succession of auxiliary signals, again disturbing the succession of signals issuing from said first mixing operation by adjoining thereto, during a second mixing operation, a second succession of auxiliary signals, whereby said two mixing operations, which are additive or subtractive, give rise to said second succession of pseudo-periodic signals, taking for said first succession of auxiliary signals said tachometric signals and generating said second succession of auxiliary signals from an external source having a freely variable frequency, whereby the frequency of said sinusoidal polyphase current may be servo-controlled by the speed of rotation of said asynchronous machine and can freely vary around this servo-controlled frequency, thereby enabling regulation of the frequency of the rotor speed of said machine.

10. A method according to claim 9, which comprises using said tachometric signals to effect the first mixing operation affecting the first of said two successions of primary signals when the asynchronous machine is required to rotate in one direction, and to effect the first mixing operation affecting the second of said two successions of primary signals when the asynchronous machine is required to rotate in the opposite direction, and effecting said second mixing operation on the same succession of primary signals as that affected by said first mixing operation when the machine is required to operate as a motor, and on the succession opposite to that affected by the first mixing operation when the machine is intended to operate as a brake.

11. An apparatus for generating a sinusoidal polyphase current having $n$ phases and having a frequency and amplitude that can be varied at will, independently of one another, said apparatus comprising a generator of monophase sinusoidal current of freely variable amplitude and having an output; a generator of rectangular $n$-phase current and having an output for each phase; means associated with at least one of said generators for varying at will the frequency of the current generated thereby; a group of $n$ amplitude modulators each having a first input connected in parallel to the output of said monophase current generator for said modulators each to receive a fraction of said monophase sinusoidal current, a second input connected to one of the outputs of said $n$-phase current generator thereby to modulate the amplitude of each said current fraction by one of the phases of said rectangular $n$-phase current, and an output for discharging the modulated current fraction; a group of $n$ low-pass filters each having an input connected to the output of one of said modulators and an output, and adapted to isolate and to deliver through their outputs the components of said modulated current fractions having a frequency equal to the absolute value of the difference between the frequency of the monophase sinusoidal current and the frequency of the rectangular $n$-phase current, said components issuing from said filter outlets forming together said sinusoidal polyphase current having $n$ phases, the frequency of said sinusoidal polyphase current being variable by actuation of said means and the amplitude of said sinusoidal polyphase current being variable by modifying the amplitude of said monophase sinusoidal current.

12. Apparatus according to claim 11, further comprising a monitoring generator for generating along two separate channels which are parallel connected thereto two identical successions of primary periodic signals of high frequency, at least one mixing stage inserted in at least one of said two channels for mixing, additively or subtractively, said succession of primary signals with a succession of auxiliary signals to generate a succession of pseudo-periodic signals, a first frequency divider connected to a first of said channels for generating, from the succession of signals carried by said first channel, a first succession of mean frequency, a second frequency divider connected to the second of said channels for generating from the succession of signals carried by said second channel a second succession of mean frequency, a variable gain tuned amplifier connected to said first frequency divider for transforming said first mean frequency succession into said monophase sinusoidal current, a closed-loop shift register connected to said second frequency divider and having $n$ stages for generating from said second mean frequency succession said rectangular $n$-phase current, each phase appearing at the output of one of said stages, and at least one variable frequency auxiliary generator for generating said succession of auxiliary signals, the devices inserted in said first channel forming, together with the monitoring generator, said generator of monophase sinusoidal current, and the devices inserted in said second channel forming, together with said monitoring generator, said generator of rectangular $n$-phase current, the frequency of said monophase sinusoidal and/or rectangular polyphase currents being variable by modifying the frequency of said auxiliary generator or generators and the amplitude of said monophase sinusoidal current being variable by modifying the gain of said tuned amplifier.

13. Apparatus according to claim 12, comprising at least one mixing stage inserted in said second channel and a variable frequency auxiliary generator supplying said mixing stage, said first frequency divider receiving the non-disturbed succession of primary signals carried by said first channel, whereby only the frequency of said rectangular $n$-phase current may be varied, the frequency of said monophase sinusoidal current being invariable.

14. Apparatus according to claim 13, comprising two mixing stages inserted in tandem in said second channel and two variable frequency auxiliary generators each supplying one of said mixing stages.

15. Apparatus according to claim 12, comprising at least one mixing stage inserted in each of said channels and at least two variable frequency auxiliary generators each supplying one of said mixing stages, whereby the frequency of said monophase sinusoidal current and the frequency of said rectangular $n$-phase current may be varied independently of one another.

16. Apparatus according to claim 15, wherein said mixing stages are adapted to ensure subtractive mixing of said successions of primary signals with said successions of auxiliary signals.

References Cited

UNITED STATES PATENTS

| | | | |
|---|---|---|---|
| 2,896,074 | 7/1959 | Newsom et al. | 318—227 XR |
| 3,247,432 | 4/1966 | Robinson | 318—227 XR |
| 3,346,794 | 10/1967 | Stemmler | 318—227 |

BENJAMIN DOBECK, *Primary Examiner.*

G. Z. RUBINSON, *Assistant Examiner.*